(12) United States Patent
Crook

(10) Patent No.: US 8,356,962 B2
(45) Date of Patent: Jan. 22, 2013

(54) LOGISTICS PANEL AND CONTAINERS

(75) Inventor: Thomas James Crook, Merrimac (AU)

(73) Assignee: CombiCan IP Pty. Ltd., Queensland (AU)

( * ) Notice: Subject to any disclaimer, the term of this patent is extended or adjusted under 35 U.S.C. 154(b) by 0 days.

(21) Appl. No.: 13/202,760

(22) PCT Filed: Feb. 23, 2010

(86) PCT No.: PCT/AU2010/000204
§ 371 (c)(1),
(2), (4) Date: Aug. 22, 2011

(87) PCT Pub. No.: WO2010/094086
PCT Pub. Date: Aug. 26, 2010

(65) Prior Publication Data
US 2012/0006814 A1    Jan. 12, 2012

(30) Foreign Application Priority Data

Feb. 23, 2009   (AU) ............................... 2009900742

(51) Int. Cl.
*B60P 7/08*   (2006.01)
(52) U.S. Cl. .............. 410/26; 410/24; 410/29.1; 410/16
(58) Field of Classification Search ................ 410/9, 14, 410/16, 17, 18, 24, 25, 26, 30, 15, 4, 19, 410/29.1; 211/191, 192, 208, 85.8; 414/495, 414/498, 541; 220/1.5
See application file for complete search history.

(56) References Cited

U.S. PATENT DOCUMENTS

| 3,842,755 | A | 10/1974 | Carr |
| 4,062,297 | A | 12/1977 | Snyder et al. |
| 7,186,065 | B2 | 3/2007 | Clive-Smith |
| 7,341,412 | B1 * | 3/2008 | Merrison ........................ 410/24 |
| 2007/0020059 | A1 | 1/2007 | Rapeli |

FOREIGN PATENT DOCUMENTS

| CN | 201140685 Y | 10/2008 |
| WO | WO 88/05001 A1 | 7/1988 |

* cited by examiner

Primary Examiner — Stephen Gordon
(74) Attorney, Agent, or Firm — The Culbertson Group, P.C.

(57) ABSTRACT

A logistics panel forms a side wall of a container (12) and has elongate metal recesses (16) formed in the surface and a logistics track (17) including a face portion (22), an elongate slot (23) in said face portion and a pair of elongate webs (24) each extending parallel to and between a respective said edge and the slot, the webs having a plurality of locating apertures, and a load carrier (18) located in said channel and extending out through the slot and having engagement pawls (26) selectively and positively locatable in said apertures.

28 Claims, 4 Drawing Sheets

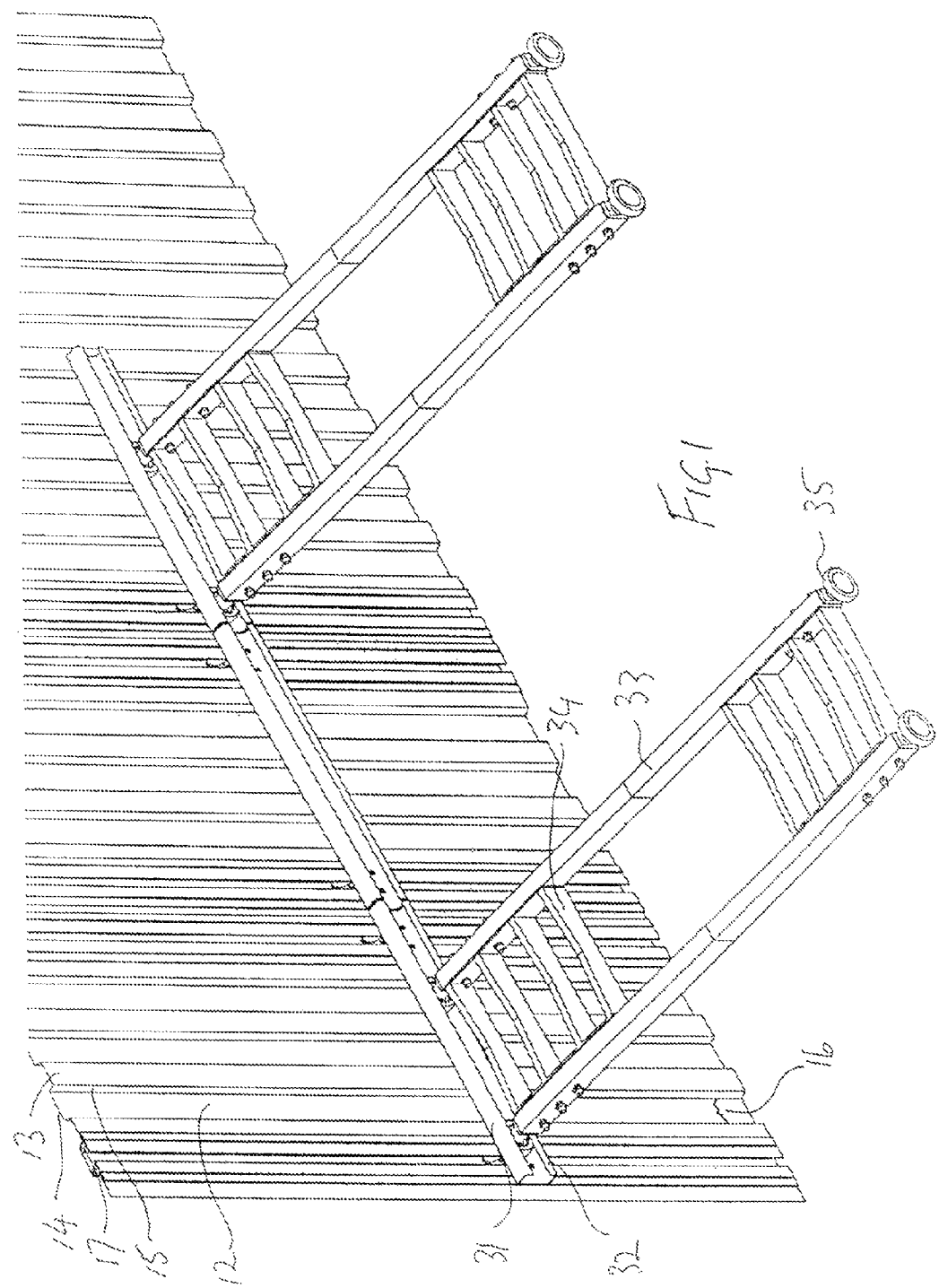

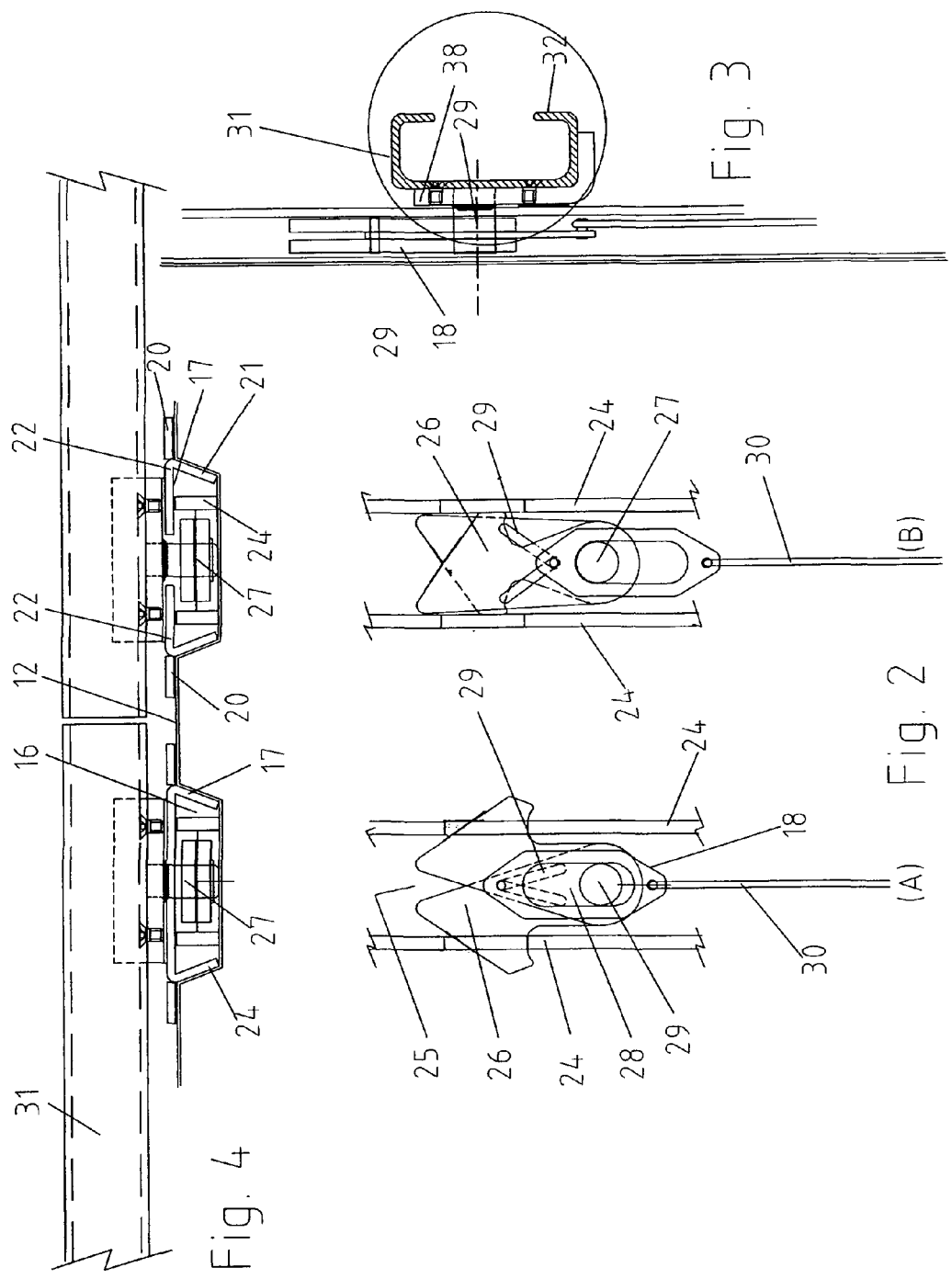

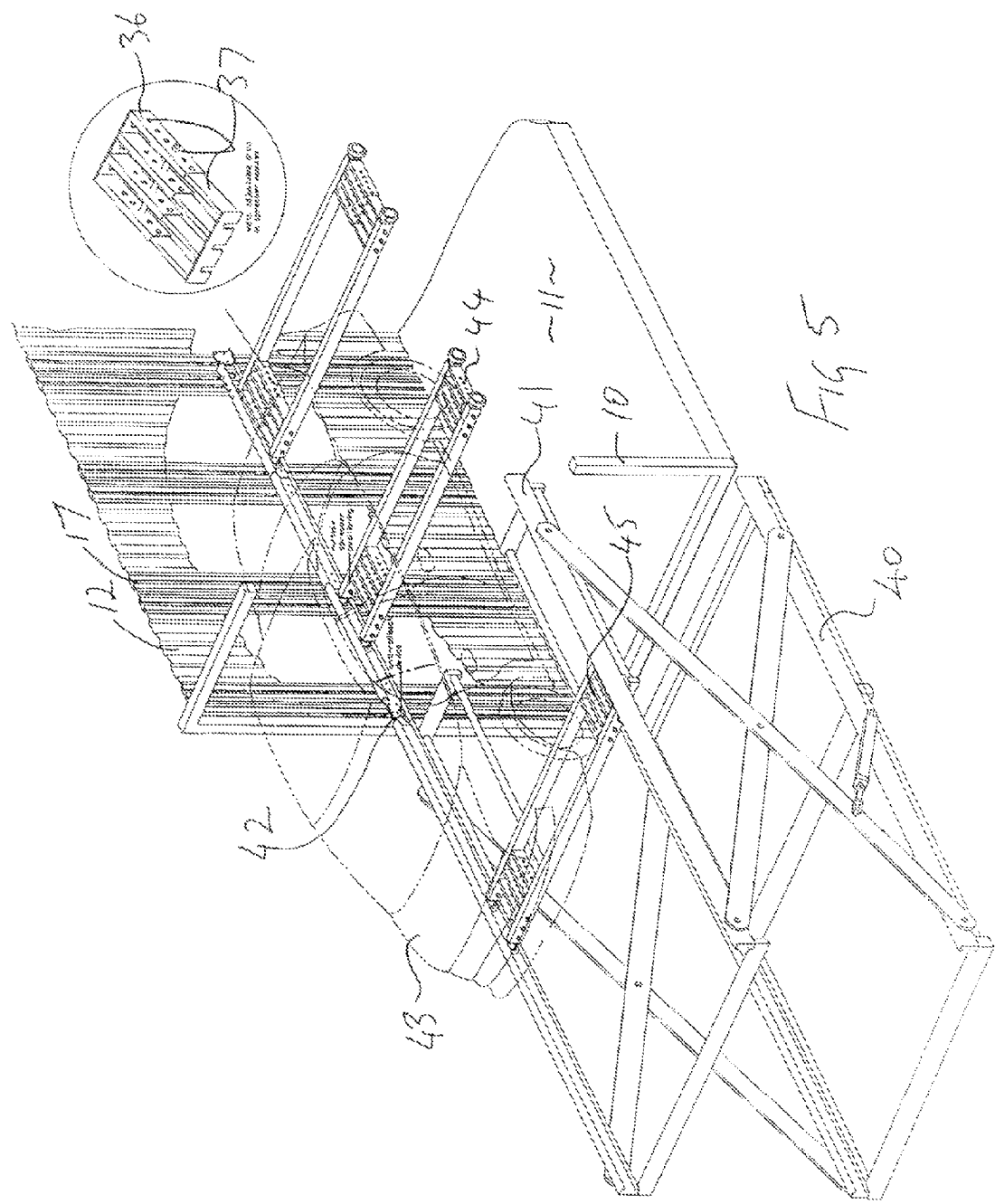

LOGISTICS PANEL AND CONTAINERS

FIELD OF THE INVENTION

This invention relates to logistics panel and containers. This invention has particular application to a logistics track-bearing panel forming part of an ISO logistics container, and for illustrative purposes the invention will be described with reference to this application. However we envisage that this invention may find use in other applications such as wall and floor installed logistics track for containers and other structures generally.

BACKGROUND OF THE INVENTION

The reference to any prior art in this specification is not, and should not be taken as, an acknowledgement or any form of suggestion that the referenced prior art forms part of the common general knowledge in the relevant art.

The potential for carriage of goods such as motor vehicles in ISO shipping containers has been recognized. However, loading densities are too low to permit stowage on the container floor only. Accordingly there have been attempts to load passenger vehicles on structures within the container.

One approach to loading vehicles into a truck involves securing horizontal load rails to either side wall of a truck or trailer body. Usually a series of vertical load bearing logistic tracks are installed to the vehicle body interior walls. The logistic track supports longitudinal C-rails at discrete heights and extending along the length of the truck side wall. The C-rails support roller-ended cross beams at selectable heights, which in turn supports respective axles of a vehicle to be transported.

The presence of the vertical logistics track impinges on the interior dimensions of the loading space. Accordingly, the system when fitted to an ISO standard container may be incapable of backloading general palletized cargo stacked two-wide in the container. TRANS-RAK™ is a specialised car transportation system. TRANS-RAK™ is a retractable, car transport system fitted inside an ISO container. A rectangular steel frame is suspended by 4 lift wires on mechanical winches located within the frame members, the lift wires being operable in front and rear pairs independently by respective "lifting screws" adapted to be rotated by a separate rotary mechanical spanner from the rear of the frame. This enables each end of the frame to be raised and lowered and tilted to optimize the use of the container space.

The frame is installed semi-permanently within the container on corner "posts" in the form of a flat bar with keyhole attachment points, and are located into the standard corrugation recesses of an ISO shipping container. The bottom of the post is located behind the "toe rail" of the container bottom side rail and the top is fitted with a head piece which is bolted to welded tags located at the top rail. The lift wires are each terminated at a respective head piece. In its essence, vertical load is borne by the top side rail and the post takes opposed longitudinal loads. This permits the use of a flat bar construction. The post is not a compression member bearing on the bottom side rail per se, since compression would flex the flat bar post out of the plane of the side wall. The loading of the side wall is via the top rail.

To support the cars longitudinally, the frame is held at each corner by a webbing strap hooked into the frame at one end and tensioned at the other end by a ratchet winch keyed into holes formed in the post. Transversely, the frame is secured by the side walls of the container, and obliquely angled webbing straps keyed to the posts.

When not in use, the frame is raised up on its lift wires into the ceiling recess of the container to free up the space below for general cargo.

In operation, a car is driven onto the frame, lashed in place, raised to the transport position, and secured by the ratchet winches. Typically, 4 cars can be transported within a 40 ft hi-cube ISO container.

The advantages of this system is the ability to lift the frame to the top of the container for back-loading conventional cargo, and the maintenance of the full container loading width in the back loading condition. The apparatus can be used with a simple (albeit powered) hand tool. Disadvantages include that the frame needs to be braced by the webbing straps from within the container and beneath the load. There must be at least two people inside and outside of the container.

SUMMARY OF THE INVENTION

In one aspect the present invention resides broadly in a logistics panel having at least one elongate metal recess formed in a surface thereof and a logistics track formed in said recess, said logistics track including a face portion secured to the edges of the open face of said recess, an elongate slot in said face portion substantially parallel to and located between said side edges and a pair of elongate webs each extending parallel to and between a respective said edge and the slot, said webs bracing said face portion against an opposed wall of said recess, said webs having a plurality of locating apertures, and a load carrier located in said channel and extending our through said slot and having engagement means selectively and positively locatable in said apertures.

The logistics panel may be adapted for use as a wall, floor or roof of a logistics container, a warehouse component, vehicle pantech, or the like. The panel may be roll formed or pressed in sheet metal such as steel, stainless steel or aluminium, or may be moulded from thermoset or thermoplastic reinforced materials such as GRP. The logistics panel may form the wall of a shipping container such as an ISO shipping container. The logistics track may, in an ISO shipping container wall panel, take the form of a vertical logistics track.

In such containers the wall panel may be formed of corrugated steel sheet of trapezoidal open profile, where the recesses to both sides of the sheet are identical and symmetrically trapezoidal in section. The components of the logistics track may advantageously be formed of ferrous metal strip capable of being welded into the trapezoidal open profile recess opening to the interior of the ISO container. The lower track end comprising the lower end of the face portion and/or the lower ends of the webs may bear in use on a bottom side rail member of the ISO container body.

The face portion may be welded to the open face of a channel or W-section forming the webs to form a substantially closed and braced, substantially trapezoidal track section adapted to be secured into the trapezoidal open profile recess of the ISO container side wall.

The carrier may be captive in the vertical track. The carrier may include a carrier body including selectively releasable engagement means adapted to engage the apertures in any one of a range of selected positions and a carrier lug extending through the slot in use and adapted to engage a functional element to be located on the panel wall thereby.

The selectively releasable engagement means may include respective opposed latch means adapted to selectively engage respective locating apertures and selected to resist disengagement under dynamic forces inducing positive and negative-G forces, lateral-G forces and combinations of these accelerations. The carrier may include manual or remotely operated disengagement means which is positively actuated to release the latch means. The disengagement means may be selected to be operable to disengage the latches only in a no-load state, so that the disengagement means is essentially inoperable when a logistics load is placed on the carrier.

The vertical logistics track may be disposed in multiples in a container or vehicle load space. For example the vertical logistics track may be disposed in pairs with one of each pair on opposite side walls of the container or vehicle load space. The carriers may be adapted to support a respective end of a load beam extending across the container or load space. The may be provided a plurality of vertical logistic tracks arranged in spaced relation along the side walls. Two or more carriers may be adapted to support a load rail such as a C-rail on the container or load space wall, enabling a roller carriage to be loading into the container for multi-level loading. The C-rail may be demountable to provide a completely CKD loading system whereby the container or vehicle load space may be back loaded as a full width and height container or load space, by the virtue of the logistics track not intruding into the load space.

The container or vehicle load space may be provided with pull-down storage for roller load platforms. In this embodiment a high-cube container may backload as a standard sized container with the height difference occupied by elements stored and captured against the container roofline.

The available combinations of elements movable along the load space, elements movable across the load space and variable height disposition of load bearing structure provides for specialized configurations to be flexibly adopted. For example, for garment-on-hanger (GOH) movements such as bulk dry cleaning, there may be provided a rolling beam system that can present garments external to the container rear doors enabling vertically roped garments to cross-dock when and as required. The GOH systems can also, on demand, accommodate multiple levels of conventional GOH trolleys and/or grouped garments. Multi-level GOH trolley systems are suitable for logistic loop arrangements. Typically a load/unload time for a 45' 4-level van space rigged in accordance with the present invention would be about 30 min for a two-man crew.

In another aspect there is provided a vehicle transport container including:
- an ISO container body having sheet steel corrugated side wall panels of open profile;
- a plurality of pairs of vertical tracks secured in respective opposed open recesses of said side wall panels;
- a plurality of rail sections each selectively securable between two adjacent tracks on a side wall, the locations including at least one load position, and a stowed position at the top of the side wall, the rail sections selectively forming a substantially continuous load rail on the side wall;
- a rolling load beam assembly extending between and supported on rollers for movement on respective opposed rail sections and including a pair of spaced wheel rests to support a respective vehicle axle group, and tie down means for securing a vehicle to the rolling load beam assembly while outside of the container body, the rolling load beam being movable along the respective load rails; and lifting means for lifting the rolling load beam, and the vehicle secured to it, into and out of engagement with the outer end of the load rail.

The ISO container body may include a load-carrying steel framework consisting of four corner posts and two bottom side rails, two top side rails, bottom cross members, a front top end rail and a door header. Bottom cross members may serve as supports for the container floor. Side walls, end walls and a roof panel form the environmental shell. The side and end walls and the roof are the components of a standard box container which are capable of bearing the least load. The potential wall loading depends on the construction materials used for them. Three main types of material used for the walls and roof are corrugated steel sheet, aluminium sheet reinforced with stiffening profiles, and GRP coated plywood. Corrugated steel sheet provides the highest potential side wall loading strength.

In steel sheet containers, a wide range of differently profiled corrugated steel sheet may be used for the outer walls. One of the most common profiles is what is known as trapezoidal open profile, where the recesses to both sides of the sheet are identical and symmetrically trapezoidal in section. The recesses are oriented vertically. The upper and lower sheet edges are welded closed to the top and bottom side rails of the container to provide side walls having the best load rating of standard containers.

The vertical tracks may be cast, fabricated or formed from metal strip. For example the vertical track may comprise a formed flat bar or strip. The vertical track may be welded, metal thread-fixed, or bonded into the recess in the side wall. The sheer strength of the attachment of the logistics track to the side wall may be supplemented by the end of the track bearing on the bottom side rail member of the container frame.

The vertical track may be formed from a single piece or may be assembled from two or more pieces. For example the track may include a face portion welded to the open face of a shallow channel or W-section to form a substantially closed and braced, roughly trapezoidal track section that may be secured into a trapezoidal open profile recess of the container side wall. The face portion may be configured to accept supporting means for the rail sections in at least a load position and a stowed position by any suitable means. For example, the face portion may be stamped with mounting apertures.

The vertical track may mount the track sections by other suitable means. There may be provided a plurality of discrete mounting positions including the stowed and the at least one load position. Accordingly the vertical track may be associated with carriers adapted to be secured in the discrete positions. The vertical track may include locating apertures into which the carriers may be selectively and positively located. For example, the vertical track may include one or more webs having a plurality of locating apertures into which corresponding lugs of carriers may be selectively located.

The carrier may be captive in the vertical track. Preferably the engagement between the carrier and the vertical track is substantially located within the portion of the vertical track that is recessed into the trapezoidal recesses of the wall. For example, a carrier may be located within the trapezoidal recess and have a mounting stud extending through a substantially continuous vertical slot provided through an outer face of the vertical track and supporting the rail section. The web forming the front face either side of the vertical slot may form the front supporting surface for a respective one of a pair of spaced, vertical webs having a plurality of corresponding locating apertures with which the captive carrier may be selectively engaged.

In view of the dynamic environment in which the invention must operate, it is preferred that there be positive mechanical engagement between the vertical web apertures and the carrier. For example, the carrier may include respective opposed latch means adapted to selectively engage respective locating apertures and selected to resist disengagement under dynamic forces inducing positive-G, reduced-G, lateral-G, on-road acceleration, braking deceleration and combinations of these accelerations. The carrier may include manual or remotely operated disengagement means which is positively actuated to release the latch means. The disengagement means may be selected to be operable to disengage the latches only in a no-load state, so that the disengagement means is essentially inoperable when a vehicle is loaded on the rolling load beam assembly.

Each adjacent pair of vertical tracks may support one or more rail sections. The rail sections may be secured in the stowed position by engagement of the latch means with stowing apertures as per the selective location in the working positions. Alternatively the rail sections may be pinned or strapped into the stowed position.

The rail sections may be of any suitable profile. For example, the rail sections may be cut from cold rolled, roll formed steel C-section. Preferably the C-section has at least a lower, upward directed lip on the C-section to provide positive lateral entrapment of any roller rolling within the C-section. The innermost of the rail sections may be provided with limit stop means adapted to provide a forward limit of travel of a rolling load beam assembly in the assembly of rail sections. The rail sections may be welded to the carrier. For example the carrier may comprise a fundamental round bar body mounting its latch means at one end and presenting a plain round bar end at the other. The round bar end may pass into a broached aperture located near the end of the rail section, and be fully welded in position, inside and out.

The rail sections may be of equal length. However, this results in many pieces being required, when most configurations of rail may be done with fewer. Accordingly, there may be provided some longer rail sections and some shorter rail sections. For example, the top rail may comprise a long section at each end and, for a 40' container, 16 shorter lengths, per side. The intermediate rail, which may also serve as the lower rail where desirable, comprises 10 standard 4' lengths of rail.

The rolling load beam assembly may take any suitable form. In its simplest form the rolling load beam assembly forms a generally rectangular panel having a rail-engaging roller in the region of each corner. In one form the rolling load beam assembly is formed as a ladder-like structure comprising spaced, elongate members extending between shorter end members, the braced and intersecting corners bearing the track-engaging rollers. The rungs of the ladder like structure may form in combination the respective vehicle wheel rest. Alternatively, the rolling load beam assembly may comprise a closed solid structure such as formed by a metal or reinforced polymer ladder frame covered and/or stiffened by metal, plywood or reinforced polymer skin. The rungs or closed solid structure may be slightly chevron-shaped or otherwise shaped to form a locating well at the wheel rest for the vehicle wheel to sit in for location.

The lifting means may form part of a vehicle or loading dock supporting a container or may be a substantially independent lifting device. The lifting means may include an electric-over-hydraulic, pneumatic or mechanical screw hoist arrangement. The lifting means may be mounted on a container carrying vehicle or trailer, skel trailer component or the like. The hoist arrangement may comprise elements that are adapted to be stowed within or without the standard chassis rails of a vehicle or trailer. Alternatively, the hoist arrangement may stow across the back of the loaded container in the manner of a drop ramp or Tieman hoist. Whether mounted on a vehicle or trailer or free standing, the lifting means may comprise a scissor lift arrangement.

The lifting means may include roll-on track means. By this means, the lifting means may be lowered to a loading level and support at least a first rolling load beam assembly whereby the first axle group of a vehicle may be driven, towed or pushed onto the rolling load beam, and be secured thereto with straps, dogs or turnbuckles. Thereafter the rolling load beam and captive axle group may be rolled forward. The next axle group may then engage the next rolling load beam assembly and be secured thereto.

The roll-on track means may include a captive-roller portion wherein the roll-on track is a C-section analogue of the rail sections. The roll-on track may comprise an open track portion whereby rolling load beam assemblies may be loaded on the lifting means. A plurality of rolling load beam assemblies may be preloaded onto the lifting means. A vehicle first axle group may then be rolled or driven over trailing rolling load beam assemblies to engage and be secured to a first rolling load beam assembly. The vehicle may be rolled or driven forward on the lifting means whereby a trailing axle group passes over rolling load beam assemblies to engage and be secured to a second rolling load beam assembly in the sequence.

The forward and/or rearward ends of the roll-on track may be provided with selectively deployable stop means operable to prevent a vehicle supported on respective rolling load beam assemblies from rolling off the lifting means out of control. The stop means may be automatic in that the action of the rolling load beam assembly rolling toward the end of the roll-on track may deploy the stop means.

The lifting means may be lifted into register with a load rail formed by the rail portions by any suitable means. The lifting means may include roll-on tracks that engage with the outer ends of the rail sections at the rear of the container to provide a substantially continuous roll-on track for the rolling load beam assemblies. For example, there may be provided mechanical latches adapted to secure the roll-on track ends to the rail section outer ends. The mechanical latches may comprise at least some elements of the stop means associated with the leading ends of the roll-on tracks.

The vehicle may be driven, pushed or winched onto the lifting means. The lifting means may include integrated winch means adapted to draw the vehicle onto the lifting means. A winch may also be used to move a vehicle from the lifting means and into a trailer. For example, the winch cable may run through a snatch block located on the front wall of the container and pass back to the front rolling load beam assembly to which it attaches by a drop-out hook. The snatch block may be operable by pulling a release lanyard when the vehicle is located against its locating stops, to drop the cable for retrieval to the winch. The lifting means may include frame members permitting the winch to be beam mounted on the lifting means so that it can be raised out of the way of subsequent insertion of rolling beam assemblies to higher rail groups. The use of a winch may also assist in loading and/or unloading against gravity where a skel or other trailer carrying the container is on a slope or the container is on a sloping ground or hardstand.

The method of loading a container may vary according to the size and shape of the vehicle, the relative spacing and number of rail sections forming through-rails in the container, and the height of the container. In one embodiment, rail portions are prepositioned to form two pairs of opposed through-rails by releasing the carrier latch means, lowering the sections into position and reengaging the latch means. A first vehicle may be winched in to a container, for example using a snatch block having a Swedish shackle connection to the bottom front rail of the container, and a drop out hook. The first positioned vehicle may then have its lower suspension points strapped or dogged down to the container floor conventionally. Alternatively the first vehicle may be rolling load beam mounted and rolled in a lower rail assembly, whereby the forward rolling load beam may be located by stops, thus avoiding the need to manually tie down. The lower rail assembly may be a fixed rail assembly at floor level to complement the stowable and configurable higher rail assemblies. Preferably, there is one fixed lower rail set and two configurable higher rail sets.

Alternatively the first vehicle may be angled and placed in the container at the high level. Thereafter the next incoming vehicle may be located on the flat, either by rolling onto the container deck and manually tying down or by rolling onto rolling load beams and inserting these to roll on a lower set of rails.

A second vehicle may then be loaded. Where the first vehicle is high and inclined with its rear downward to the front of the container, the second vehicle may be inserted at floor level until the roof line is beneath the higher of the rolling load beam assemblies supporting the first vehicle.

Alternatively, if the first vehicle is on the flat, the lifting means may be operated to place the first rolling load beam assembly supporting the first axle group of the second vehicle into engagement with the upper pair of opposed through rails. The second axle group on its rolling load beam assembly may then be rolled into the lower pair of opposed through rails to present the vehicle in an inclined attitude. The inclined vehicle may then be advanced with negligible force (if the container is level) to nest over the first vehicle. The second vehicle may then be locked into position by locking the rolling load beam assembly to the rail sections.

The vehicles to be shifted may be automobiles or may be light commercial vehicles, and other unpackaged vehicles such as golf carts, quad bikes, ride on lawn mowers and motorbikes, rolling chassis and bulk vehicle components and spare parts, whether or not located on pallets, which may form a platform between two rolling beam assemblies. The rolling beam assemblies may be disassembled to form a pair of load beams for support of pallets.

The system is designed to handle, in-transit problems created by ships and railcars being loose shunted and or rolling and yawing around in inclement weather, system equipment losses, part theft and or damage potential plus the awkward load-unload procedures, not to mention the limited skill and capacity of the people handling the systems.

In a further aspect the present invention resides broadly in a vehicle transport container including:

an ISO container body having sheet steel corrugated side wall panels of open profile;
a plurality of vertical tracks recessed into respective opposed open recesses of said side wall panels;
a pair of opposed load rails each adjustably secured to said tracks adjacent a respective said side wall panel;
a rolling load beam assembly extending between and supported on rollers for movement on respective opposed load rails and including a pair of spaced wheel rests to support a respective vehicle axle group, and tie down means for securing a vehicle to the rolling load beam assembly while outside of the container body, the rolling load beam being movable along the respective load rails; and
lifting means for lifting the rolling load beam, and the vehicle secured to it, into and out of engagement with the outer ends of the load rails.

BRIEF DESCRIPTION OF THE DRAWINGS

The invention will be described with reference to the following non-limiting embodiment of the invention as illustrated in the drawings and wherein:

FIG. 1 is a perspective view, part cut away, of apparatus in accordance with the present invention;

FIGS. 2 A and B are sequential views of a carrier and track assembly for use in the apparatus of FIG. 1;

FIG. 3 is a sectional end view of the apparatus detail of the FIGS. 2;

FIG. 4 is a sectional plan view of the apparatus detail of the FIGS. 2;

FIG. 5 is an operational diagram of the apparatus of FIG. 1 in use; and

Figure 6:
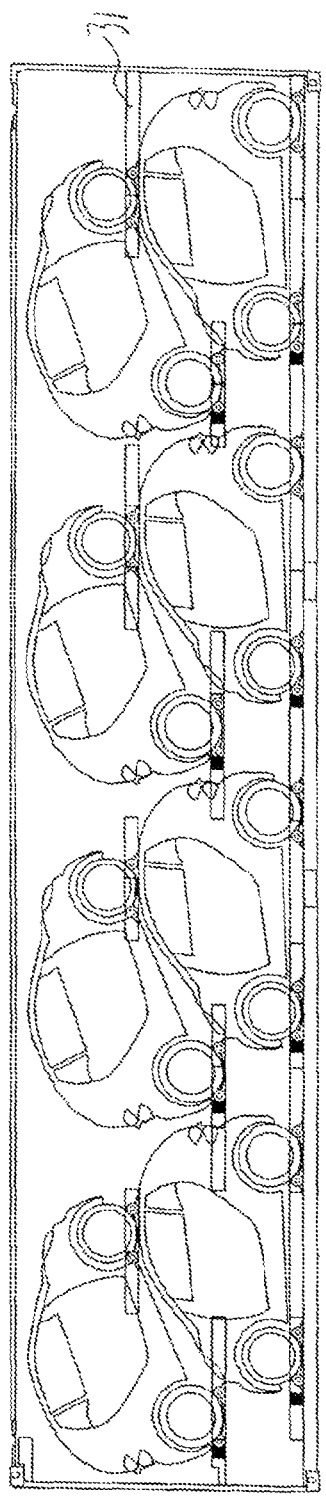
FIGS. 6 and 7 are loading options of the apparatus of FIG. 1 in use.
Figure 7:
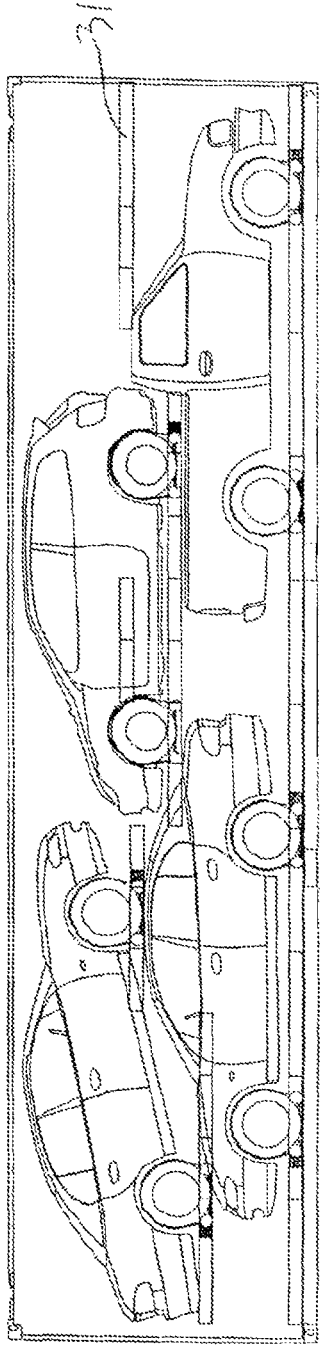

In the figures there is provided a vehicle transport container including an ISO container frame (10) conventionally supporting a container floor (11) and corrugated steel side walls (12). The corrugated steel side walls (12) are of trapezoidal open profile wherein internal surface-defining inner flat portions (13) are connected to external surface-defining outer flat portions (14) by sloping webs (15), to define open-faced recesses (16) of generally trapezoidal shape.

Welded into selected ones of the recesses (16) are vertical tracks (17) having lateral flanges (20) supporting the track against the inner flat portions (13) and sloping flanges (21) supporting the track against the sloping webs (15). Front flanges (22) are cantilevered from the junction of respective lateral flanges (20) and sloping flanges (21), the front flanges (22) defining a vertical slot (23) therebetween. Slotted bracing webs (24) define a central vertical cavity (25) disposed symmetrically about the vertical slot (23).

The central vertical cavity (25) houses three rail carrier assemblies (18), of which two are omitted for clarity, and each including a central stud (19) welded to an outer flange (38) machine screwed adjacent an end of a load rail section (31). The central stud (27) mounts a pair of pivoting pawls (26) spring loaded by spring (29) into engagement with respective slotted bracing webs (24). A release plate (28) is slotted about the central stud (19) and linked to the pawls (26), whereby drawing down on the release plate (28) by draw cable (30) withdraws the pawls (26) from the respective slotted bracing webs (24) allowing the rail carrier assembly (18) to slide up and down the central vertical cavity (25) for raising and lowering the load rail section (31) to a selected position.

The load rail section (31) has opposed outer vertical flanges (32) to provide a track for captive rollers (35) mounted to the ends of load beams (33). The load beams (33) are disposed in spaced pairs interconnected by left and right groups of closely-spaced wheel support bars (34). The wheel support bars (34) may be configured as per FIG. 5, where the support bars (34) are adjustable having an outer support bar portion (36) telescoped to an inner support bar portion (37) and mutually securable by a cross pin (39) through the group.

A lifting hoist (40) includes complementary rail sections (41) adapted to be brought into engagement with the outermost pair of load rail sections (31), which are provided with engagement means including anti-roll-back latches (42).

In use, two load beam assemblies (44, 45) are preloaded into the complementary rail sections (41). A vehicle (43) is driven on to front most preloaded beam assembly (44) so its front axle is on the support bars (34) and is tied down external of the container. The vehicle (43) is then drawn on to the rearward preloaded beam assembly (45) so its rear axle is on the support bars (34) and is also tied down external of the container. The lifting hoist (40) is operated and the complementary rail sections (41) are engaged with the load rail sections (31) via the engagement means including anti-roll-back latches (42).

At this point, if the vehicle (43) is to be loaded on the level, both preloaded load beam assemblies (44, 45) are rolled into engagement with a continuous load rail formed by multiple load rail sections (31) in assembly, until the captive rollers (35) engage stops placed in selected load rail sections (31). On the other hand, if the vehicle (43) is to be loaded on an angle, the front most preloaded beam assembly (44) is rolled into a first continuous load rail formed by multiple load rail sections (31) in assembly. The lifting hoist (40) is then repositioned in engagement with a second continuous load rail formed by multiple load rail sections (31) in assembly, either higher of lower than the first. Thereafter, the rearward preloaded beam assembly (45) is rolled into the second continuous load rail until the captive rollers (35) engage stops placed in selected load rail sections (31) of the first and second continuous load rails.

Apparatus in accordance with the foregoing embodiment enables standard and/or Hi-Cube 9'6" containers, to readily load or unload vehicles and other general cargo, On-Truck, On-Ground and On-Dock via a multiple of differing elevating devices. The embodiment offers multi-level variable height systems, with captive pull-down elements to prevent loss and able to re-locate into the roofline or alternatively detachable elements. Containers can carry 2 or more vehicles dependant on the length of the container. The invention allows the operator to load-unload vehicles without the need for staff to drive and or enter into or exit the actual vehicle as all tie-down actions occur either at the rear of the load or external to the conveying vehicle. The system allows roll in or roll out of vehicles via one person always located at the rear of the load. The system allows the operator to load and unload vehicles ex standard skel Trailers at any level, street or dock, via a variety of detachable elevating platforms. The system has increased security, reduced potential for external damage and reduced potential for occupational health and safety risk issues. The system enables on-demand, direct delivery from any manufacturer in the world to a suburban front door, a pre-delivered vehicle in showroom condition. In backloading, the container can accommodate all International (eg. CHEP®) pallets skids, bins and folding pallet containers (FLC's)

The return load capacity in terms of automotive applications includes the capacity to return-load part or full loads of unpackaged vehicle components such as gear boxes, specialist skids, panels, small transit containers and or loose cargo via the manufacturer's logistic cycle or within the container pool system. The system reduces packaging and double-handling costs. The system enables all of the above same actions within standard containers—semitrailers and rigid body road vans. Vehicles can bypass specialist car/boat autoports and transit direct to the dealers or customers located interstate local and or adjoining countries already seamlessly connected via conventional intermodal and basic standard container ships via sea rail and road network.

The prior art appear limited to 2 cars per 20' of container whereas the present system can load, for example, up to 6 small town cars.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:
1. A vehicle transport container including:
an ISO container body having sheet steel corrugated side wall panels of open profile;
a plurality of pairs of vertical tracks secured in respective opposed open recesses of said side wall panels;
a plurality of rail sections each selectively securable between two adjacent ones of said tracks on one of said side wall panels, locations including at least one load position, and a stowed position at the top of the side wall panel, the rail sections selectively forming a substantially continuous load rail on the side wall panel;
a rolling load beam assembly extending between and supported on rollers for movement on respective opposed ones of said rail sections and including a pair of spaced wheel rests to support a respective vehicle axle group, and tie down means for securing a vehicle to the rolling load beam assembly while outside of the container body, the rolling load beam assembly being movable along the respective rail sections; and lifting means for lifting the rolling load beam, and a vehicle secured to it, into and out of engagement with an outer end of a respective one of the load rail sections.

2. A vehicle transport container according to claim 1, wherein the vertical tracks are welded into selected ones of the recesses in the side wall panels.

3. A vehicle transport container according to claim 1, wherein the vertical tracks have a lower track end bearing in use on a bottom side rail member of the ISO container body.

4. A vehicle transport container according to claim 1, wherein each vertical track includes a face portion welded to an open face of a channel or W-section to form a substantially closed and braced, substantially trapezoidal track section adapted to be secured into a trapezoidal open profile recess of one of said container side wall panels.

5. A vehicle transport container according to claim 1, wherein each vertical track includes a plurality of discrete mounting positions including the stowed and the at least one load position.

6. A vehicle transport container according to claim 5, wherein each vertical track is associated with load rail section carriers adapted to be secured in the discrete positions.

7. A vehicle transport container according to claim 6, wherein each vertical track includes locating apertures into which the carriers are be selectively and positively locatable.

8. A vehicle transport container according to claim 7, wherein each vertical track includes one or more webs having a plurality of said locating apertures into which corresponding lugs of the carriers are selectively located in use.

9. A vehicle transport container according to claim 6, wherein a respective one of the carriers is captive in a respective one of the vertical tracks.

10. A vehicle transport container according to claim 6, wherein engagement between the carrier and the vertical track is substantially located within a portion of the vertical track that is recessed into the respective recess of the wall panel.

11. A vehicle transport container according to claim 10, wherein the carrier is located within a trapezoidal recess in a wall of trapezoidal open section and has a mounting stud extending through a substantially continuous vertical slot provided through an outer face of the vertical track and supporting a respective one of the rail sections.

12. A vehicle transport container according to claim 8, wherein there is positive mechanical engagement between the web apertures and the respective one of said carriers.

13. A vehicle transport container according to claim 12, wherein the carrier includes respective opposed latch means adapted to selectively engage respective locating apertures and selected to resist disengagement under dynamic forces inducing positive-G, reduced-G, lateral-G, on-road acceleration, braking deceleration and combinations of these accelerations.

14. A vehicle transport container according to claim 13, wherein the carrier includes manual or remotely operated disengagement means which is positively actuated to release the latch means.

15. A vehicle transport container according to claim 14, wherein the disengagement means is selected to be operable to disengage the latch means only in a no-load state, so that the disengagement means is essentially inoperable when a vehicle is loaded on the rolling load beam assembly and the rolling load beam assembly is supported by the respective rail section.

16. A vehicle transport container according to claim 1, wherein the rolling load beam assembly forms a generally rectangular panel having a rail-engaging one of said rollers in the region of each corner thereof.

17. A vehicle transport container according to claim 16, wherein the rolling load beam assembly is formed as a ladder-like structure comprising spaced, elongate members extending between shorter end members, braced and intersecting corners thereof bearing the rail-engaging rollers.

18. A vehicle transport container according to claim 17, wherein rungs of the ladder like structure form in combination a respective one of the wheel rests.

19. A vehicle transport container according to claim 1, wherein the lifting means is selected from lifting means forming part of a vehicle or loading dock supporting a container or a substantially independent lifting device.

20. A vehicle transport container according to claim 1, wherein the lifting means includes an electric-over-hydraulic, pneumatic or mechanical screw hoist arrangement.

21. A vehicle transport container according to claim 20, wherein the hoist arrangement comprises elements that are adapted to be stowed within or without the standard chassis rails of a vehicle or trailer.

22. A vehicle transport container according to claim 1, wherein the lifting means comprises a scissor lift arrangement.

23. A vehicle transport container according to claim 1, wherein the lifting means includes roll-on track means.

24. A vehicle transport container according to claim 23, wherein the roll-on track means includes a captive-roller portion wherein the roll-on track means is an analogue of the rail sections.

25. A vehicle transport container according to claim 23, wherein the roll-on track means engage with outer ends of the rail sections at the rear of the container to provide a substantially continuous roll-on track for the rolling load beam assembly.

26. A vehicle transport container according to claim 1, wherein the lifting means includes integrated winch means adapted to draw the vehicle onto the lifting means.

27. A vehicle transport container according to claim 1, wherein a winch is provided to move a vehicle from the lifting means and into the container.

28. A vehicle transport container including:
   an ISO container body having sheet steel corrugated side wall panels of open profile;
   a plurality of vertical tracks recessed into respective opposed open recesses of said side wall panels;
   a pair of opposed load rails each adjustably secured to said tracks adjacent a respective said side wall panel;
   a rolling load beam assembly extending between and supported on rollers for movement on respective opposed ones of said load rails and including a pair of spaced wheel rests to support a respective vehicle axle group, and tie down means for securing a vehicle to the rolling load beam assembly while outside of the container body, the rolling load beam assembly being movable along the respective load rails; and
   lifting means for lifting the rolling load beam assembly, and a vehicle secured to it, into and out of engagement with outer ends of the load rails.

\* \* \* \* \*

UNITED STATES PATENT AND TRADEMARK OFFICE
CERTIFICATE OF CORRECTION

| | |
|---|---|
| PATENT NO. | : 8,356,962 B2 |
| APPLICATION NO. | : 13/202760 |
| DATED | : January 22, 2013 |
| INVENTOR(S) | : Thomas James Crook |

Page 1 of 1

It is certified that error appears in the above-identified patent and that said Letters Patent is hereby corrected as shown below:

At column 10, line 42: change "are be selectively" to read --are selectively--.

Signed and Sealed this
Ninth Day of April, 2013

Teresa Stanek Rea
*Acting Director of the United States Patent and Trademark Office*